(12) United States Patent
Shindo (10) Patent No.: US 6,463,998 B1
(45) Date of Patent: Oct. 15, 2002

(54) VEHICLE AIR CONDITIONING VENTILATION SYSTEM AND APPARATUS HAVING POSITIONAL DOORS AND BLOW-SWITCHING MODES

(75) Inventor: Tomohide Shindo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/713,463

(22) Filed: Nov. 14, 2000

(30) Foreign Application Priority Data

Nov. 18, 1999 (JP) .......................................... 11-328476

(51) Int. Cl.$^7$ ................................................ B60H 1/34
(52) U.S. Cl. ........................ 165/204; 165/42; 454/152; 237/12.3 B
(58) Field of Search ........................ 165/42, 202, 203, 165/43, 204; 454/121, 152, 155, 160, 69; 237/12.3 A, 12.3 B (56) References Cited

U.S. PATENT DOCUMENTS

| | | | | |
|---|---|---|---|---|
| 3,661,069 A | * | 5/1972 | Grosseau | |
| 4,420,115 A | * | 12/1983 | Matsushima et al. ... | 237/12.3 A |
| 5,042,566 A | * | 8/1991 | Hildebrand ................. | 165/42 |
| 5,062,352 A | * | 11/1991 | Ostrand ..................... | 165/42 X |
| 5,063,833 A | * | 11/1991 | Hara et al. ................. | 454/152 |
| 5,101,883 A | * | 4/1992 | Kinmartin et al. ........ | 165/42 X |
| 5,106,018 A | * | 4/1992 | Loup ..................... | 237/12.3 B |
| 5,109,755 A | * | 5/1992 | Guillemin .............. | 237/12.3 A |
| 5,129,859 A | * | 7/1992 | Yagi ............................ | 454/155 |
| 5,137,491 A | | 8/1992 | Ishihara et al. ............. | 454/152 |
| 5,462,483 A | * | 10/1995 | Loup | |
| 5,476,418 A | * | 12/1995 | Loup ........................... | 454/121 |
| 5,779,535 A | * | 7/1998 | Bendell et al. ............. | 454/121 |
| 6,007,421 A | * | 12/1999 | Schwart ................... | 454/160 X |
| 6,179,044 B1 | * | 1/2001 | Tabara .......................... | 165/42 |
| 6,209,404 B1 | * | 4/2001 | Le ............................. | 454/69 X |
| 6,231,437 B1 | * | 5/2001 | Loup et al. ................. | 454/160 |
| 6,296,563 B1 | * | 10/2001 | Vincent ....................... | 454/121 |
| 6,319,111 B1 | * | 11/2001 | Queinnec .................... | 454/121 |

FOREIGN PATENT DOCUMENTS

JP      Y2-62-44803      11/1987

* cited by examiner

Primary Examiner—Ljiljana Ciric
(74) Attorney, Agent, or Firm—Harness, Dickey & Pierce, PLC

(57) ABSTRACT

A vehicle air conditioning flow apparatus is constructed of a heat exchanger that heats and cools air that is directed along an air flow path ultimately directed through openings and at vehicle occupants. The air passes through a face outlet having shaft mounted doors that open and close the face outlet to direct air at an occupant's head and a foot outlet having shaft mounted doors to direct air at an occupant's feet. Furthermore, a case has the face outlet and the foot outlet formed in it while a face door has a peripheral plate that opens and closes the face outlet. The face door has a connection plate that connects the peripheral plate and the shaft. The peripheral plate may have a length extending from a point of rotation to allow the face outlet to close within a range of positions.

12 Claims, 11 Drawing Sheets

VEHICLE AIR CONDITIONING VENTILATION SYSTEM AND APPARATUS HAVING POSITIONAL DOORS AND BLOW-SWITCHING MODES

The present invention is related to Japanese patent application No. Hei. 11-328476, filed Nov. 18, 1999.

FIELD OF THE INVENTION

The present invention relates to an air-conditioning apparatus for a vehicle, and more particularly, to an air-conditioning apparatus for a vehicle having doors for switching blow modes.

BACKGROUND OF THE INVENTION

A recent trend in the field of air conditioning apparatus for vehicles is characterized by an increased need for air conditioning for luxury vehicles, which blows conditioned air to the front and rear seats. Such device also /has independent control allowing the rear seat occupants to set a blow mode or blowing temperature.

Figure 11:
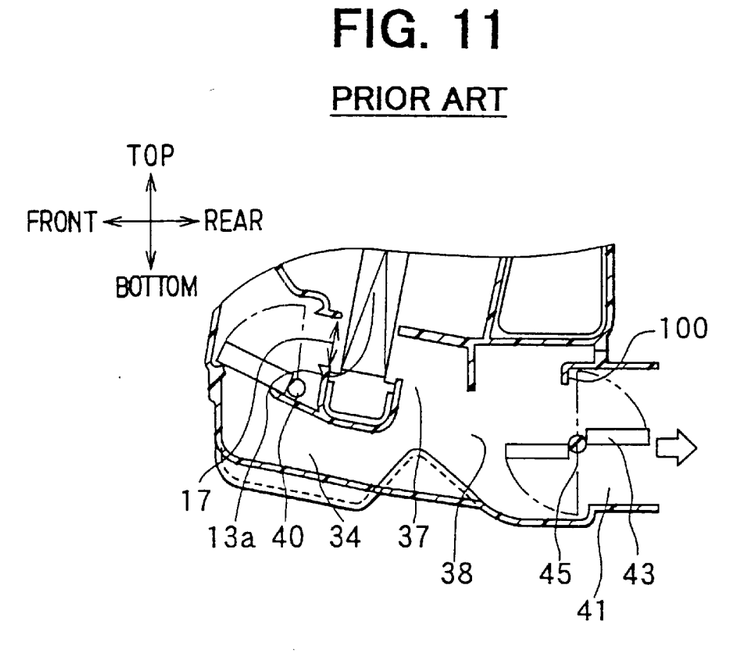
FIG. 11 is a cross-sectional view illustrating an air conditioning unit according to the prior art.
Figure 12:
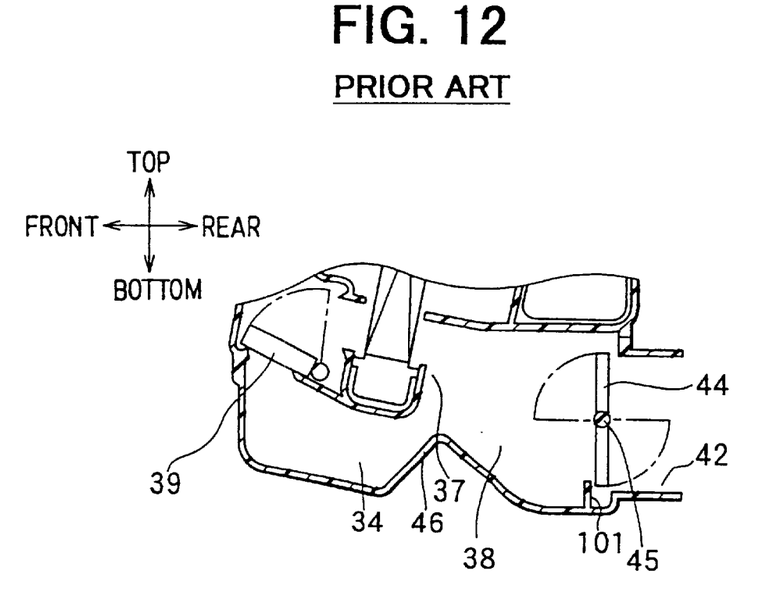
FIG. 12 is a cross-sectional view illustrating an air conditioning unit according to the prior art.

For example, in Japanese Patent Application 11-207717, discloses an air conditioning apparatus for a vehicle, as shown in FIGS. 11, 12, which provides an independent control. FIGS. 11, 12 show the rear seat flow distribution section of the air conditioning unit comprising a face outlet 41 for the rear seat, which blows air toward the rear seat occupants head, a butterfly-type face door 43 for the rear seat, which opens and closes face outlet 41 for the rear seat, a foot outlet 42 for the rear seat, which blows out the air toward the rear seat occupant feet, and a butterfly-type foot door 44 for the rear seat, which opens and closes this foot outlet for the rear seat. Both the face door 43 for the rear seat and the foot door 44 for the rear seat are connected to a rotatable shaft 45.

The blow mode is switched by rotating the foot door 44 for the rear seat with a single drive means (not shown) via the shaft 45. More specifically, as shown in FIG. 13, the face mode can blow air toward the rear seat occupant's head, a foot mode blows air toward the rear seat occupant feet, and the bi-level mode blows air from both outlets 41, 42.

Here, when the front seat blow mode is defrost, air blows toward the windshield glass and the rear seat blow mode is set to the foot mode. However, when the front seat blow mode is defrost, a shut mode is preferably set where the face outlet 41 for the rear seat and the foot outlet 42 for the rear seat are closed. This increases the air blown onto the windshield glass and improves defogging performance. Furthermore, the rear seat blow mode is preferably set to a shut mode and blows air toward the rear seat and stopped when there are no occupants in the rear seat.

Figure 13:
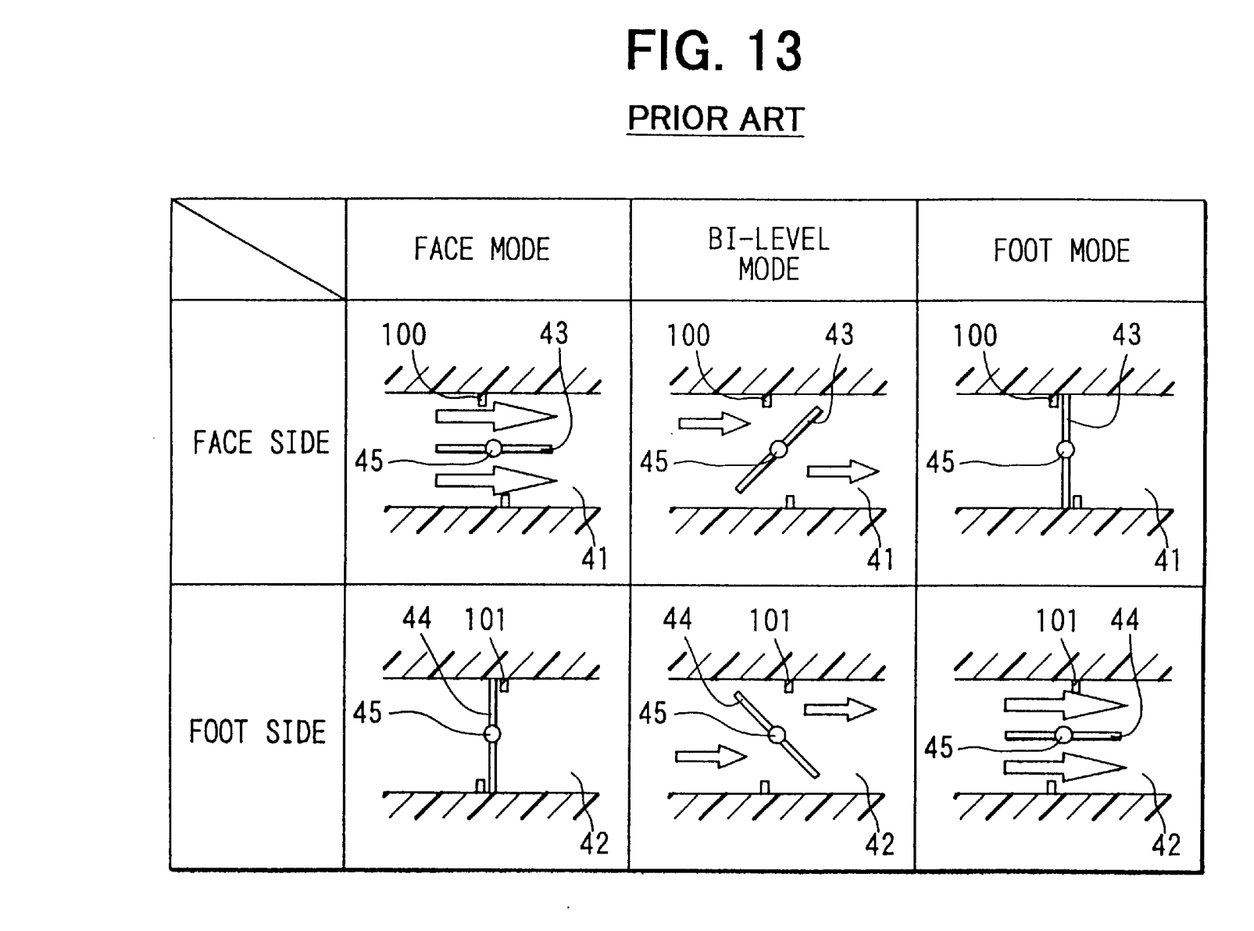
FIG. 13 is a cross-sectional view illustrating an air conditioning apparatus according to the prior art.

However, in the above-described apparatus, as is clear from FIG. 13, the face outlet 41 is opened in the face mode. Also, in the foot mode, the foot outlet 42 is opened. And, in the bi-level mode, both outlets 41, 42 are opened. It is not possible to close both outlets 41, 42 at the same time. For this reason, when the front seat blow mode is defrost or when there are no occupants in the rear seat, air blowing to the rear seat cannot be stopped, and blow modes suitable for various air conditioning control states cannot be set.

SUMMARY OF THE INVENTION

The present invention provides an air conditioning apparatus for a vehicle where both the face doors and the foot doors are connected to a rotatable shaft. At a first position, the face outlet opens and the foot outlet closes. The foot outlet can be rotated to a third position. Here, the face doors close the face outlet and the foot doors close the foot outlet for the front seat, which blow air toward the front seat occupant. Defroster outlets are provided that blow air toward the rear seat occupant head. The foot outlet blows air toward the rear seat occupant's feet. The defroster outlets are selected as a front seat blow mode, then the shaft is operated to the third position.

As a result, if the defroster mode is selected, the shaft is operated to the third position, and both the face outlet and the foot outlet for the rear seat are closed. Therefore, air blowing to the rear seat is stopped, the amount of air blown onto the windshield glass is increased, and the defogging performance is improved.

In another aspect, both the face outlet and the foot outlet open to an intermediate position between the first position and second position. As a result, a bi-level mode is set where air is blown out from both the face outlet and the foot outlet. In another aspect, the doors of at least one type of face doors and foot doors is composed of plate-like doors.

In another aspect of the invention, the foot doors are composed of plate-like doors and the case is provided with two seating surfaces for the foot, which close the foot outlet in cooperation with the foot doors in the first position and third position. In another aspect, the foot door has a peripheral plate that opens and closes the face outlet connecting the peripheral plate and the shaft. A first seating surface contacts one end of the peripheral plate in the rotation direction in the first position, a second seating surface contacts the other end of the peripheral plate in the rotation direction in the third position, and a third seating surface is constantly in contact with the peripheral plate between the first position and third position. These seating surfaces are formed in the case. The door contacts both the first seating surface for the foot and the third seating surface for the foot, and the foot outlet is closed. In the third position the peripheral plate contacts both the second seating surface for the foot and the third seating surface for the foot, and the foot outlet is closed.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Referring to FIGS. 1–6, a ventilation system of an air conditioning apparatus for a vehicle is divided broadly into two portions. Specifically, the two portions are an air conditioning unit 10 and a blower unit (not shown), which blows air into air conditioning unit 10. The blower unit is disposed in the lower part of an instrument panel in the vehicle compartment, offset from the center thereof toward the passenger's seat. By contrast, air conditioning unit 10 is disposed in the lower part of the vehicle compartment instrument panel almost in the center thereof in the left-right direction of the vehicle. The blower unit consists of an inner-outer air switch box which switches the air supply between the outer air (air outside the vehicle compartment) and inner air (air inside the vehicle compartment) and a blower which sucks air in through the inner-outer air switch box.

More specifically, air conditioning unit 10 has an evaporator (heat exchanger for cooling) 12 and a heater core (heat exchanger for warming) 13 that are integrally enclosed in single common air conditioning case 11. The air conditioning unit 10 is disposed almost in the center of the lower portion of the instrument panel inside the vehicle compartment, with the mounting direction being shown by arrows in FIGS. 1 and 2 with respect to the front-rear, left-right, and top-bottom directions of the vehicle.

An air inlet orifice 14 is formed in the side surface of air conditioning unit 11 at the most frontward side. The blown air from the case outlet of the blower of the above-described blower unit flows into air inlet orifice 14.

An evaporator 12 is disposed just behind air inlet orifice 14 in air conditioning case 11. The evaporator 12 has a thin-shape configuration in the front-rear direction and is disposed almost vertically so as to cross the passage inside air conditioning case 11. Therefore, the blown air from air inlet orifice 14 flows onto the front surface of the evaporator 12, which extends in the top-bottom direction of the vehicle. The evaporator absorbs the latent heat of evaporation of coolant in the cooling cycle from the conditioned air, and cools the conditioned air.

Figure 2:
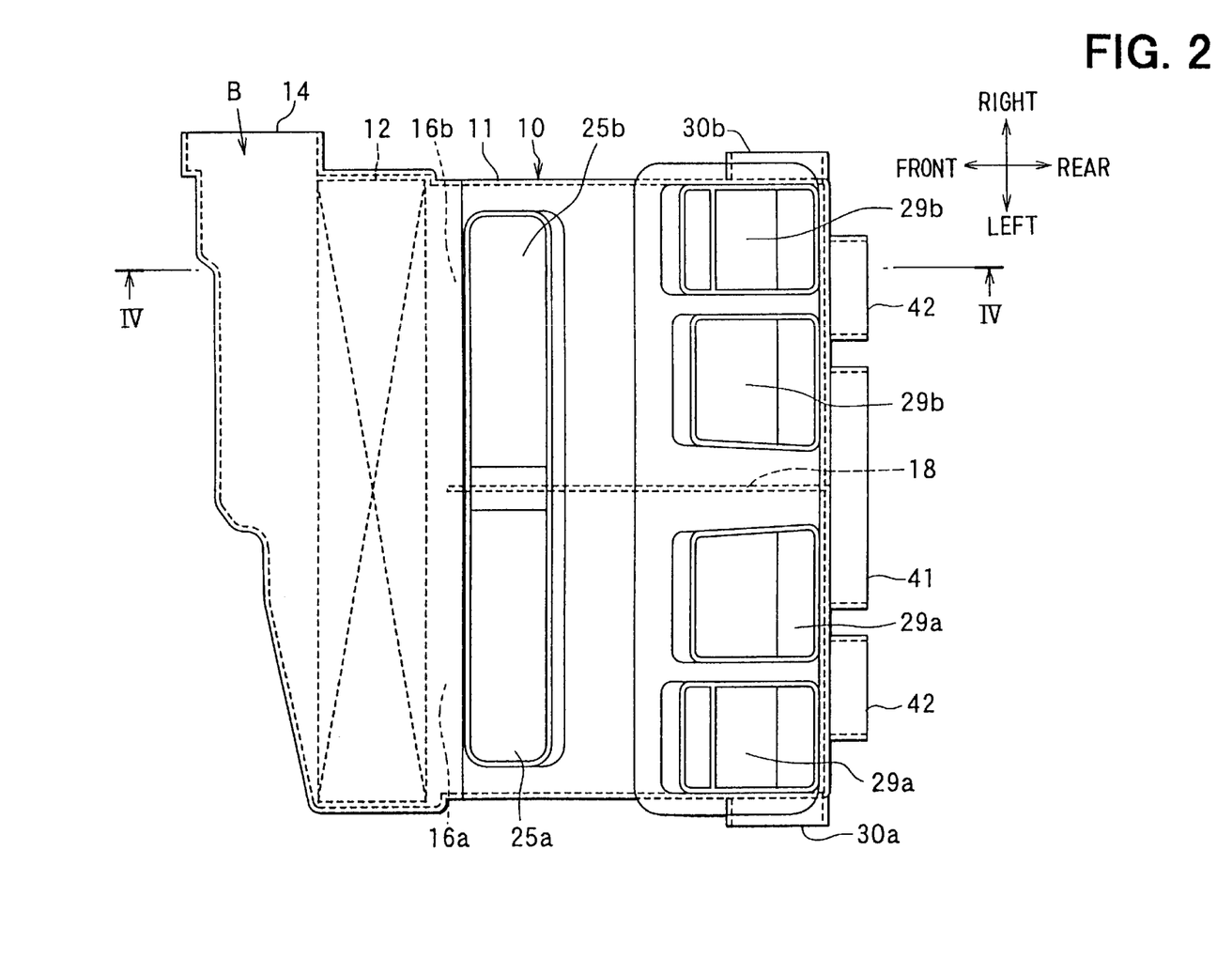
FIG. 2 is a plan view of an air conditioning apparatus for a vehicle according to the present invention.

A heater core 13 is disposed at an air flow downstream side of the evaporator 12 (at a vehicle rearward side) at a prescribed distance therefrom. The heater core 13 is disposed with a slight inclination to a vehicle rearward side at a lower side inside air conditioning case 11. Furthermore, the lateral size of evaporator 12 in the left-right direction of the vehicle is designed to be almost equal to the lateral size of air conditioning case 11, as shown in FIG. 2. The heater core 13 is not shown in FIG. 2, but the lateral size of the heater core 13 in the left-right direction of the vehicle is also designed to be almost equal to the lateral size of air conditioning case 11.

The cold flow that passed the evaporator 12 is reheated by the heater core 13. High-temperature hot water (engine cooling water) flows inside the heater core, and the air is heated by this hot water as a heat source. The heater core 13 has a core portion 13a for heat exchange, which consists of a flat tube through which the hot water passes and corrugated fins joined thereto. The air passage of this core portion 13a for heat exchange is partitioned with a first partition member 15 into an upper channel 16 for the front seat and a lower channel 17 for the rear seat.

Here, the first partition member 15 is disposed at an air flow upstream side of the heater core 13 and is formed so as to run the entire length of the inner space of air conditioning case 11 in the left-right direction of the vehicle.

Figure 3:
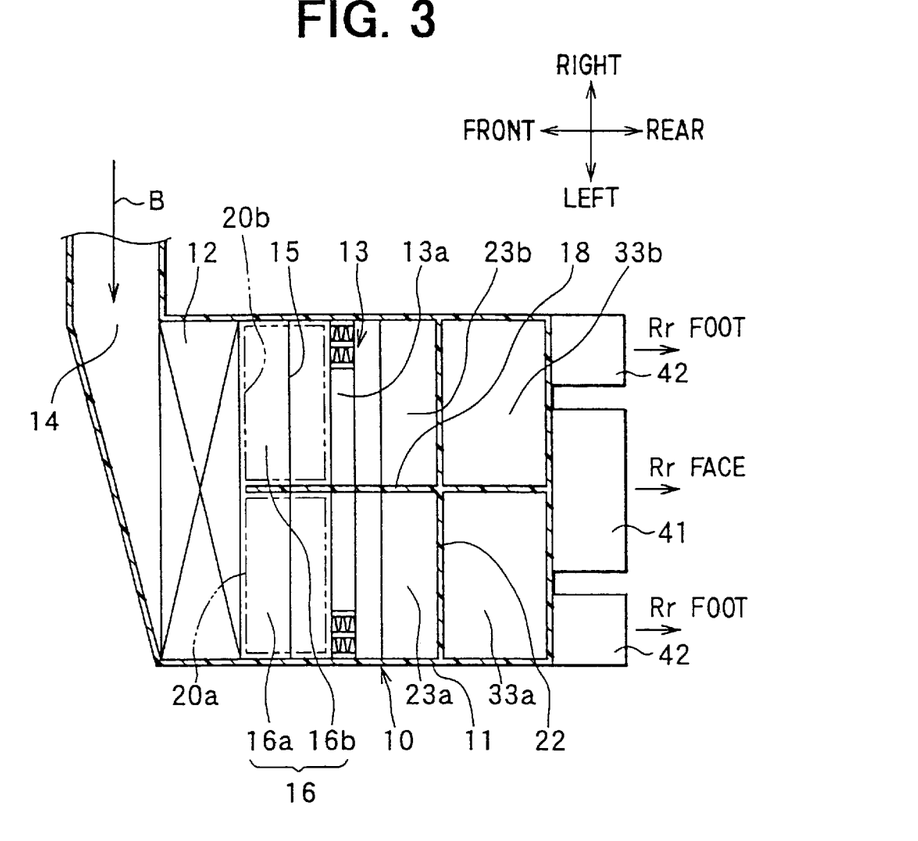
FIG. 3 is a cross section along A—A in FIG. 1 for an air conditioning apparatus for a vehicle according to the present invention.

Furthermore, the upper channel 16 for the front seat, as shown in FIGS. 2, 3, is partitioned by the second partition member 18 into a driver's seat channel 16a positioned. at the left side of the vehicle and a passenger's seat channel 16b positioned at the right side of the vehicle. The second partition member 18 is disposed in the central portion, in the left-right direction of the vehicle, in the inner space of air conditioning case 11. It is disposed along the entire zone from the region immediately after the evaporator 12 to the below-described outlet for the front seat.

Therefore, the entire upper channel 16 for the front seat down from the region immediately after the evaporator 12 is separated into two sections in the left-right direction of the vehicle. The first and second partition members 15, 18 may be formed separately from air conditioning case 11 or may be integrated with air conditioning case 11.

Cold flow bypass passages 19a, 19b for the front seats, through which air (cold flow) flows bypassing the heater core 13, are formed in the region above the heater core 13 in the air passage inside air conditioning case 11. The cold flow bypass passages 19a, 19b for the front seats are partitioned into a driver's seat side and a passenger's seat side by a second partition member 118.

Furthermore, plate-shaped air mixing doors 20a, 20b for the front seats are disposed in the channel 16a at a driver's seat side and channel 16b at a passenger's seat side, respectively, in the position between the heater core 13 and the evaporator 12. Air mixing doors 20a, 20b for the front seats (driver's seat side and passenger's seat side) adjust the ratio of heated air in channel 16 (16a, 16b) for front seats and to cold flow bypassing the heater core 13 via the cold flow bypass passages 19a, 19b for the front seats.

The air mixing doors 20a, 20b for the front seats are integrally connected to rotary shafts 21a, 21b disposed in the horizontal direction (left-right direction of the vehicle) that rotate independently around the rotary shafts 21a, 21b. The air mixing doors 20a, 20b for the front seats serve as temperature adjusting means which independently adjust the temperature of air blown out to the driver's seat side and passenger's seat side by adjusting the above-mentioned air ratio.

The rotary shafts 21a, 21b are supported by air conditioning case 11 so that they are free to rotate. One end of each rotary shaft 21a, 21b protrudes to the outside of air conditioning case 11 and is connected via a link mechanism (not shown) to the respective independent actuator mechanism using a servo motor.

The rotation position of air mixing doors 20a, 20b is independently adjusted with these actuator mechanisms.

On the other hand, in air conditioning case 11, a wall 22 extended in the vertical direction so that it is at the prescribed distance from the heater core 13, is formed integrally with air conditioning case 11 at an air flow downstream side (at a vehicle rearward side) of the heater core 13. The wall 22 forms hot flow passages 23a, 23b for the front seats, which go upward from a position immediately behind the heater core 13.

The downstream (upper) side of hot flow passages 23a, 23b for the front seats merge with the downstream side of cold flow bypass passages 19a, 19b in the zone above the heater core 13, and air mixing portions 24a, 24b for the front seats, which mix the hot and cold flows. The hot flow passages 23a, 23b and air mixing portions 24a, 24b for the front seats are also partitioned into the driver's seat side and passenger's seat side by the second partition member 18.

At the upper surface of air conditioning case 11, defroster outlets 25a, 25b at the driver's seat side and passenger's seat side open adjacent to air mixing portions 24a, 24b. Conditioned air with a controlled temperature flows from air mixing portions 24a, 24b into the defroster outlets 25a, 25b, connected to the defroster blowing orifice via defroster ducts (not shown). Air is blown out onto the inner surface of the windshield glass of the vehicle from the defroster blowing orifice.

Communication orifices 28a, 28b partitioned into the driver's seat side and passenger's seat side are provided at an air flow downstream side of air mixing portions 24a, 24b for the front seats adjacent to the defroster outlets 25a, 25b. These communication orifices 28a, 28b let conditioned air from air mixing portions 24a, 24b flow to the below-described face outlets 29a, 29b for the front seats and foot outlets 30a, 30b for the front seats.

The defroster outlets 25a, 25b and communication orifices 28a, 28b switch closed and open by the plate-like defroster doors 26a, 26b at the driver's seat side and passenger's seat side. These defroster doors 26a, 26b can rotate around rotary shafts 27a, 27b disposed in the horizontal direction close to the upper surface portion of air conditioning case 11.

Face outlets 29a, 29b are provided in the upper surface portion of air conditioning case 11 in the region at a vehicle rearward side (toward the occupants) from the defroster outlets 25a, 25b. The face outlets 29a, 29b are connected via a face duct (not shown) to a face blowing orifice disposed at an upper side of the instrument panel, and air is blown from this face blowing orifice toward the occupant head inside the vehicle compartment.

In air conditioning case 11, foot outlets 30a, 30b are provided below the face outlets 29a, 29b. Foot outlets 30a, 30b open on both side surfaces (on both the left and the right sides) of air conditioning case 11 (see FIG. 2) and blow air to the occupant feet on a driver's seat side and a passenger's seat side. Flat-plate foot/face switching doors 31a, 31b are disposed between the face outlets 29a, 29b and foot outlets 30a, 30b to rotate by rotary shafts 32a, 32b. These switching doors 31a, 31b open and close the inlet passages of the face outlets 29a, 29b and foot outlets 30a, 30b.

The defroster doors 26a, 26b and foot/face switching doors 31a, 31b switch the blow mode for the front seats. The defroster door 26a and foot/face switching door 31a are connected to a common actuator mechanism consisting of a servo motor via a link mechanism (not shown) and are motion controlled by the actuator mechanism.

Similarly, the defroster door 26b and foot/face switching door 31b are connected to a common actuator mechanism consisting of a servo motor via a link mechanism (not shown) and are sequentially operated by the actuator mechanism. Further, a cold flow bypass passage 34 for the rear seat, which causes the cold flow from the evaporator 12 outlet to bypass the heater core 13, is formed in a region below the heater core 13 inside air conditioning case 11.

Furthermore, a fixed partition member 35 is disposed on a air flow downstream side of the heater core 13 to face channel 17 for the rear seat. Fixed partition member 35 separates the hot flow passages 23a, 23b for the front seats from the hot flow passage 37 for the rear seat. The hot flow passage 37 for the rear seat is a passage connecting the downstream side of the channel 17 for the rear-seat of the heater core 13 to air mixing portion 38 for the rear seat positioned at a lower side inside air conditioning case 11.

On the other hand, a plate-shaped air mixing door 39 for the rear seat is disposed, rotated by a rotary shaft 40, upstream of the heater core 13 at a side of the channel 17 for the rear seat. Then, the ratio of the hot flow air passing through the channel 17 and to the cold flow air passing through the cold flow bypass passage 34 is adjusted with air mixing door 39 for the rear seat. The hot and cold flow are mixed in air mixing portion 38 for the rear seat. As such, air having the desired temperature is obtained. The air mixing door 39 for the rear seat constitutes means for adjusting the temperature at a rear seat side, which adjusts the temperature of air blown to the rear seat inside the vehicle compartment.

The rotary shaft 40 of air mixing door 39 is disposed in the horizontal direction (left-right direction of the vehicle). One end of the shaft protrudes to the outside of air conditioning case 11 and is connected via a link mechanism (not shown) to an independent actuator mechanism that uses a servo motor or the like. The rotation position of air mixing door 39 for the rear seat is adjusted with this actuator mechanism.

Figure 5:
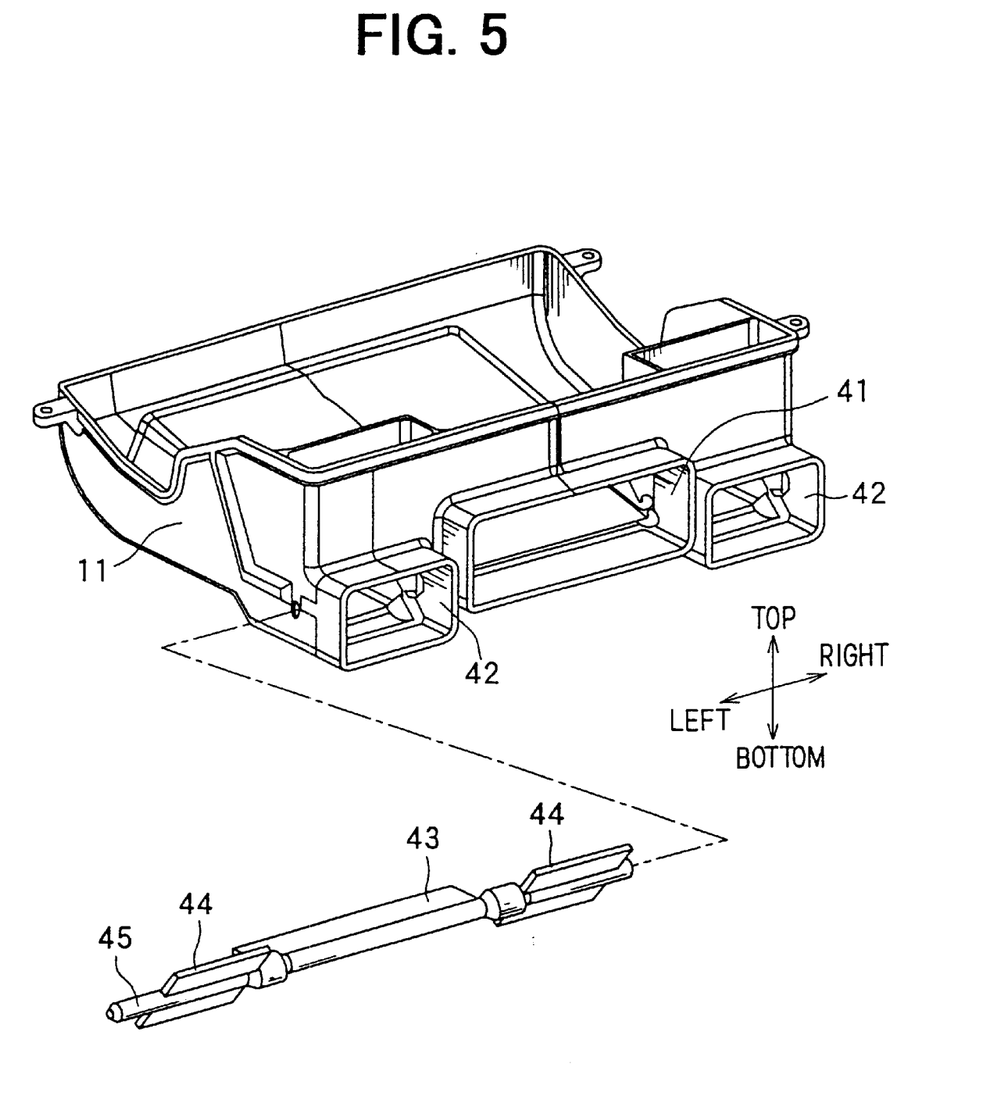
FIG. 5 is an exploded perspective view of a rear seat flow distribution unit for an air conditioning apparatus for a vehicle according to the present. invention.

A face outlet 41 for the rear seat and foot outlet 42 for the rear seat are disposed at a downstream side (at a vehicle rearward side) of air mixing portion 38 for the rear seat below air conditioning case 11. In this example, as shown in FIGS. 2, 5, the face outlet 41 for the rear seat is disposed in the central zone in the left-right direction of the vehicle, and the foot outlets 42 for the rear seat are disposed both on the left and the right sides of the face outlet 41 for the rear seat.

The face outlet 41 for the rear seat is connected to the face blowing orifice for the rear seat via a connection duct (not shown). The air mixed in air mixing portion 38 for the rear seat is blown from this face blowing orifice toward the head of the rear seat occupant. Furthermore, the foot outlet 42 for the rear seat is connected to the foot blowing orifice for the rear seat via a connection duct (not shown). The air mixed in air mixing portion 38 for the rear seat is blown from this foot blowing orifice toward the feet of the rear seat occupant.

Further, a face door 43 for the rear seat, which opens and closes face outlet 41, is disposed in the face outlet 41 for the rear seat. The face door 43 consists of a plate-shaped cantilever door. On the other hand, a foot door 44 for the rear seat, which opens and closes the foot outlet 42, is disposed in the foot outlet 42 for the rear seat. The foot door 44 consists of a plate-like butterfly door.

Figure 1:
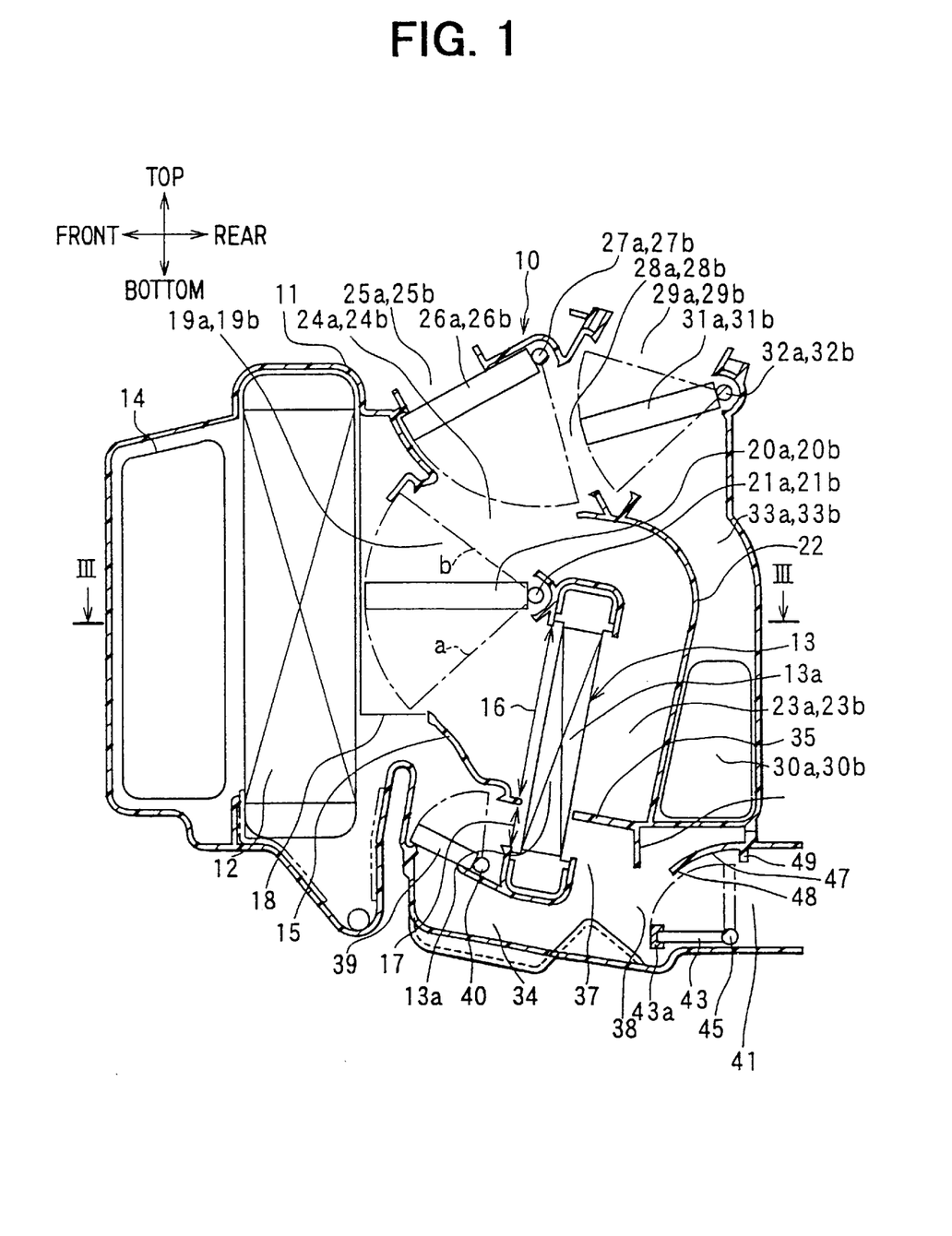
FIG. 1 is a cross-sectional view of an air conditioning apparatus for a vehicle according to the present invention.
Figure 4:
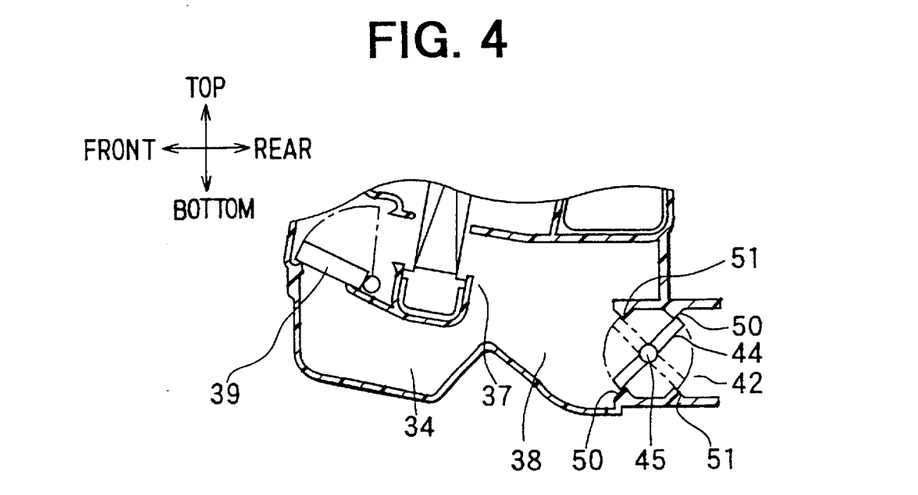
FIG. 4 is a cross section along C—C in FIG. 2 for an air conditioning apparatus for a vehicle according to the present invention.

Doors 43, 44 are connected to the common rotary shaft 15 and, as shown in FIGS. 1, 4, rotate within a 90-degree range from the position shown by a solid line to a position shown by a dot-and-dash line. The rotary shaft 45 is supported by air conditioning case 11 so that it is free to rotate. One end of the rotary shaft 45 protrudes to the outside of air conditioning case 11 and is driven via a. link mechanism (not shown) by an independent actuator mechanism (drive means) using a servo motor.

A recess portion 47 for the face, formed with an :arcuate shape matching the rotation trajectory of the front end of the face door 43, is provided where in the face outlet 41 to avoid interference with the face door 43. Here, the relationship between the front end of the face door 43 and the recess portion 43*a* allows face door 43 to rotate, while the sealing packing 43*a* attached to the peripheral edge of the face door 43 remains in contact with the recess portion 47 for the face.

A first seating surface 48 for the face, which contacts the front end of the face door 43 where face door 43 rotates through 45 degrees from the solid line position, is formed at the left end of recess portion 47 for the face, as shown in FIG. 1. Furthermore, a second. seating surface 49 for the face, contacting the face door 43 where the face door 43, rotated through 90 degrees from the solid line position, is formed. It then protrudes to the air passage side, at the right end of the recess portion 47 for the face, as shown in FIG. 1.

Furthermore, a first seating surface 50 for the foot, contacting the foot door 44, when the foot door 44 is in the solid line position, and a second seating surface 51 for the foot, contacting the foot door 44 when the foot door 44 is rotated through 90 degrees, protrudes into the air passage where the foot outlet 42 is formed. Well-known sealing packing is also attached, for example, with an adhesive to various doors other than the face door 43. This packing is not shown.

The operation of the present embodiment will be described below for each blow mode.

Figure 6:
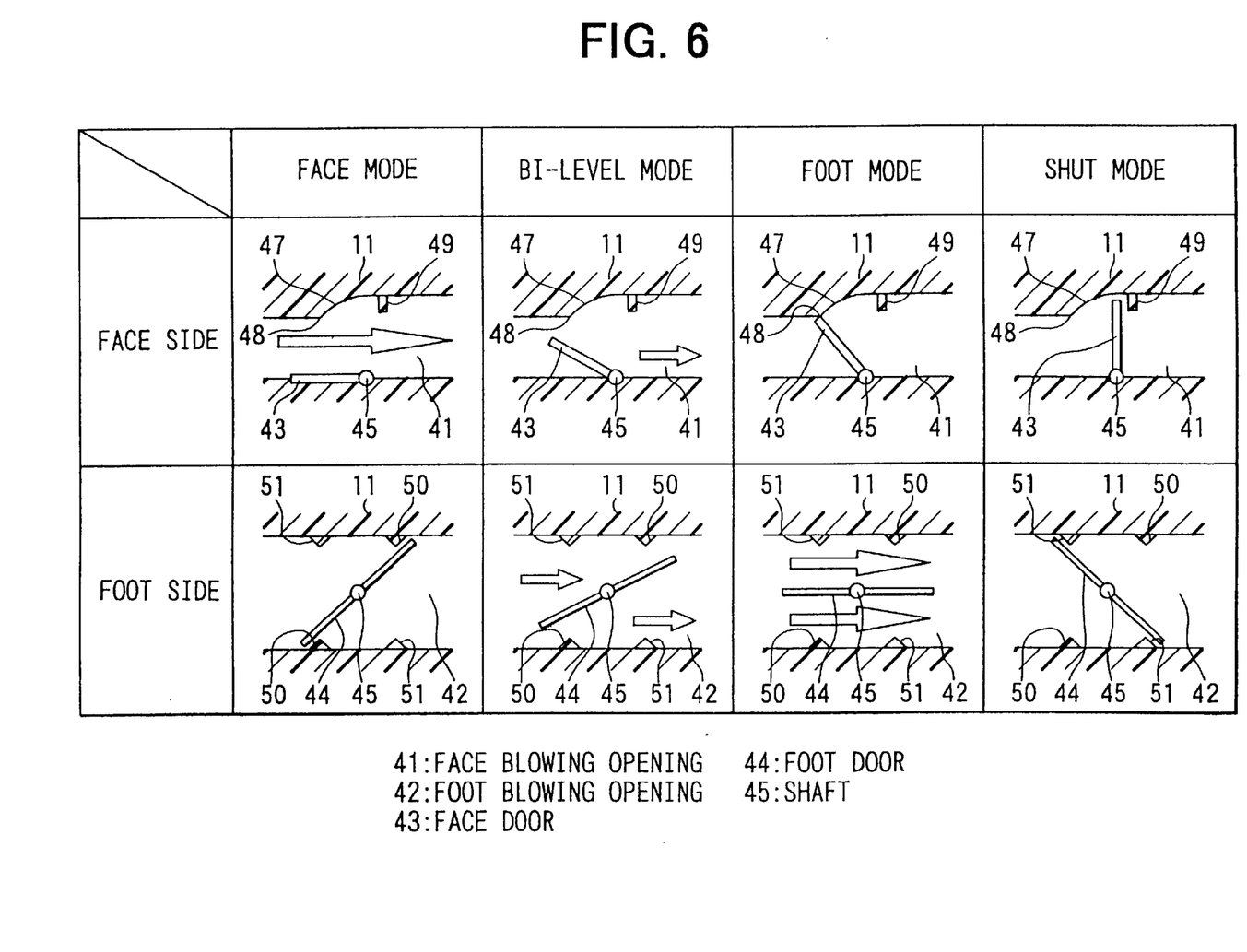
FIG. 6 is a cross-sectional view illustrating the operation state for an air conditioning apparatus for a vehicle according to the present invention.

(1) Face mode. If the face mode is selected as a blow mode for the front seats and rear seat, then the defroster outlets 25*a*, 25*b* are closed by the defroster doors 26*a*, 26*b*, and the communication orifices 28*a*, 28*b* are totally opened. Furthermore, the doors 31*a*, 31*b* for foot/face switching totally close the inlet passages 33*a*, 33*b* of the foot outlets 30*a*, 30*b* for the front seats. Moreover, as shown in FIG. 6, the face door 43 for the rear seat totally closes the face outlet 41 for the rear seat, and the foot door 44 for the rear seat contacts the first seating surface for the foot and closes the foot outlet: 42 for the rear seat. At this time, if air mixing doors 20*a*, 20*b* are controlled to position (a) shown in FIG. 1, then a maximum cooling state is set where channel 16 for the front seats of the heater core 13 is totally closed and the cold flow bypass passages 19*a*, 19*b* are totally opened. If the blower unit and cooling cycle are operated in this state, air blown from the blower unit is introduced from air inlet orifice 14 and cooled with evaporator 12 to obtain a cold flow.

In the maximum cooling state, this cold flow is passed as is through the cold flow bypass passages 19*a*, 19*b* for the front seats to air mixing portions 24*a*, 24*b* for the front seats and directed into the face outlets 29*a*, 29*b* for the front seats via the communication orifices 28*a*, 28*b*. As a result, the cold flow is blown from the face blowing orifices for the front seats toward the front seat occupant head.

If air mixing doors 20*a*, 20*b* for the front seats are operated from the position (a) (maximum cooling position) shown in FIG. 1 to the intermediate opening position to control the temperature of air blown into the compartment, a large portion of the cold flow corresponding to the opening position of air mixing doors 20*a*, 20*b* passes through the cold flow bypass passages 19*a*, 19*b*. The remaining portion of the cold flow goes into the channel 16 for the front seats of the heater core 13, where it is heated to a hot flow that rises along the hot flow passages 23*a*, 23*b* for the front seats. Then, the cold flow of the cold flow bypass passages 19*a*, 19*b* for the front seats and hot flow from the hot flow passages 23*a*, 23*b* for the front seats are mixed in air mixing portions 24*a*, 24*b* for the front seats, and the desired temperature is obtained.

Here, the temperature of air blown to the driver's seat and passenger's seat can be controlled independently by controlling the opening positions of air mixing door 20*a* for the driver's seat and air mixing door 20*b* for the passenger's seat of the front seats.

On the other hand, if air mixing door 39 for the rear seat is operated to a dot-and-dash line position (maximum cooling position) shown in FIG. 1, then air flow to channel 17 for the rear seat of the heater core 13 is shut off and the cold flow bypass passage 34 for the rear seat is totally opened. Therefore, a maximum cooling state for the rear seat is set. In this maximum cooling state, the cold flow from the. outlet orifice of evaporator 12 is passed as is through the cold flow bypass passage 34 for the rear seat and directed toward the face outlet 41 for the rear seat via air mixing portion 38 for the rear seat. As a result, the cold flow is blown from the face blowing orifices for the rear seat toward the rear seat occupant head.

If air mixing door 39 for the rear seat is operated from the dot-and-dash line position shown in FIG. 1 to the intermediate opening position, the flow rate ratio of the cold flow from the cold flow bypass passage 34 for the rear seat and the hot flow from the hot flow passage 37 for the rear seat can be adjusted. Also, the cold flow and hot flow are mixed in air mixing portion 38 for the rear seat, and the desired temperature is obtained. Therefore, the independent control of the operation position (rotation position) of air mixing doors 20*a*, 20*b* for the front seats and air mixing door 39 for the rear seat allows independent control of the face blowing air temperature for the three seats the front driver's seat, the front passenger's seat, and the rear seat.

(2) Bi-level mode. The defroster doors 26*a*, 26*b* are operated to the solid line position shown in FIG. 1, the foot/face switching doors 31*a*, 31*b* are operated to the solid line position shown in FIG. 1 and both the face outlets 29*a*, 29*b* for the front seats and the inlet passages 30*a*, 30*b* of the foot outlets 30*a*, 30*b* for the front seats are opened. Furthermore, as shown in FIG. 6, the face door 43 for the rear seat is rotated clockwise through 22.5 degrees from its position during the face mode to half open the face outlet 41 for the rear seat, and the foot door 44 for the rear seat is rotated clockwise through 22.5 degrees from its position during the face mode to half open the foot outlet 42 for the rear seat.

The bi-level mode is ordinarily used in autumn and spring. Therefore, air mixing doors 20*a*, 20*b* for the front seats are operated to intermediate opening positions, air with adjusted temperature is blown from the face outlets 29*a*, 29*b* for the front seats and the foot outlets 30*a*, 30*b* for the front seats blow upward and downward the front seats in the vehicle compartment at the same time.

Furthermore, by operating the air mixing door 39 for the rear seat into the intermediate opening position, it is possible to blow adjusted temperature air upward and downward on the rear seat in the compartment from the face outlet 41 and foot outlet 42 at the. same time.

(3) Foot, mode. The defroster doors 26*a*, 26*b* are operated to the position in which the defroster outlets 25*a*, 25*b* are slightly opened and the communication orifices 28a, 28b are opened (almost totally opened). Furthermore, the foot/face switching doors 31a, 31b are operated to a position where the face outlets 29a, 29b for the front seats are closed and the inlet passages 30a, 30b of the foot outlets 30a, 30b for the front seats are totally opened.

Furthermore, as shown in FIG. 6, the face door 43 for the rear seat rotates clockwise through 45 degrees from its position during the face mode, the sealing packing 43a of the face door 43 for the rear seat contacts the first seating surface 48 for the face, and the face outlet 41 for the rear seat is closed. On the other hand, the foot door 44 for the rear seat rotates clockwise through 45 degrees from its position during the face mode and totally opens the foot outlet 42 for the rear seat.

At this time, if the air mixing doors 20a, 20b for the front seats are moved to the dot-and-dash line position (b) shown in FIG. 1, then a maximum warming state is set where the cold flow bypass passages 19a, 19b are totally closed and the channel 16 for the front seats of the heater core 13 is totally opened. In this state, the air blown from the blower unit flows in through the air inlet orifice 14, then passes through evaporator 12 and flows into the channel 16 for the rear seat of the heater core 13. Here, it is heated to form a hot flow. The hot flow. rises along the hot flow passages 23a, 23b for the front seats, reaches the air mixing portions 24a, 24b for the front seats, and thence flows to the foot outlets 30a, 30b for the front seats via the communication orifices 28a, 28b. The hot flow is blown therefrom toward the front seat occupant feet.

Furthermore, if during this time the air mixing door 39 for the rear seat is moved to the solid line position shown in FIG. 1, the cold flow bypass passage 34 for the rear seat is-totally closed. Channel 17 for the rear seat of the heater core 13 is totally opened. This sets a maximum rear seat warming state. In this state,. the entire amount of air blown toward the rear seat below the partition member 15 is heated in channel 17 for the rear seat of the heater core 13. As such, a hot flow is obtained. This hot flow is directed toward the foot outlet 42 for the rear seat through the hot flow passage 37 for the rear seat and air mixing portion 38 for the rear seat. Furthermore, the hot flow is blown toward the rear seat occupant feet from the foot outlet 42 for the rear seat via the foot blowing orifice for the rear seat.

If the air mixing doors 20a, 20b for the front seats and the air mixing door 39 for the rear seat are independently operated from the dot-and-dash line position (maximum warming position) shown in FIG. 1 into any intermediate position, then the mixing ratio of the cold flow and hot flow can be independently adjusted both at a front seat side and a rear seat side. As a result, the temperature of air blown to the front seat and rear seat occupant feet can be controlled independently.

Furthermore, in the foot mode, the ratio of air blown from the defroster outlets 25a, 25b to air blown from the foot outlets 30a, 30b for the front seats is usually 7 to 3 at the front seat side. However, if the defroster doors 26a, 26b are positioned where the opening degree of the defroster outlets 25a, 25b increases and the opening degree of the communication orifices 28a, 28b decreases with respect to that during the foot mode, the ratio of air blown from the defroster outlets 25a, 25b to air blown from the foot outlets 30a, 30b for the front seats is about 5 to 5. As a result, the foot defroster mode is set where the window glass defogging effect is higher than that in the foot mode.

(4) Defroster mode. If the defroster mode is selected, the defroster doors 26a, 26b move to the dot-and-dash line position shown in FIG. 1, the defroster outlets 25a, 25b are totally opened, and the, communication orifices 28a, 28b are closed. Further, if the air mixing doors 20a, 20b for the front seats move to the dot-and-dash line position (b) (maximum warming position) shown in FIG. 1, then hot air heated in channel 16 for the front-seats is blown through the hot flow passages 23a, 23b for the front seats and defroster outlets 25a, 25b toward the windshield glass of the vehicle from the defroster blowing orifice, thereby defogging the windshield glass.

Furthermore, as shown in FIG. 6, face door 43 for the rear seat rotates clockwise through 90 degrees from its position during the face mode, the sealing packing 43a of the face door 43 for the rear seat contacts the second seating surface 49 for the face, and the face outlet 41 for the rear seat is totally closed. On the other hand, the foot door 44 for the rear seat rotates clockwise through 90 degrees from its position during the face mode, and the foot door 44 contacts the second seating surface 51 for the foot and totally closes the foot outlet 42 for the rear seat.

In the present embodiment, the recess portion 47 for the face is provided and the face door 43 and foot door 44 can rotate beyond the foot mode position. Moreover, the structure is such that both the face outlet 41 and foot outlet 42 are closed in when rotated beyond the foot mode position. As a result, the face outlet 41 or the foot outlet 42 can only be opened. Also, both openings 41, 42 (a shut mode) can be effected. Therefore, blow modes suitable for various air conditioning control states can be set.

Furthermore, the face door 43 and foot door 44 are connected to the common shaft 45, and the face outlet 41 and foot outlet 42 can be closed (a shut mode). Therefore, the necessity for installing a special door and drive means separately for setting a shut mode is eliminated and the cost and installation space can be reduced accordingly. When the defroster mode is selected, both the face outlet 41 for the rear seats :and the foot outlet 42 for the rear seats are closed. Specifically, the rear seat side is in the shut mode stopping air blowing to the rear seat side, allowing the increase in air blown to the windshield glass to improve defogging efficiency.

In Embodiment 1, the face door 43 for the rear seat was a plate-like cantilever door. However, a face door 60 for the rear seat, which consists of a plate-like butterfly door, as in. Embodiment 2 illustrated by FIG. 7, can also be used. Components which are not shown in FIG. 7 are identical to those described in Embodiment 1.

Figure 7:
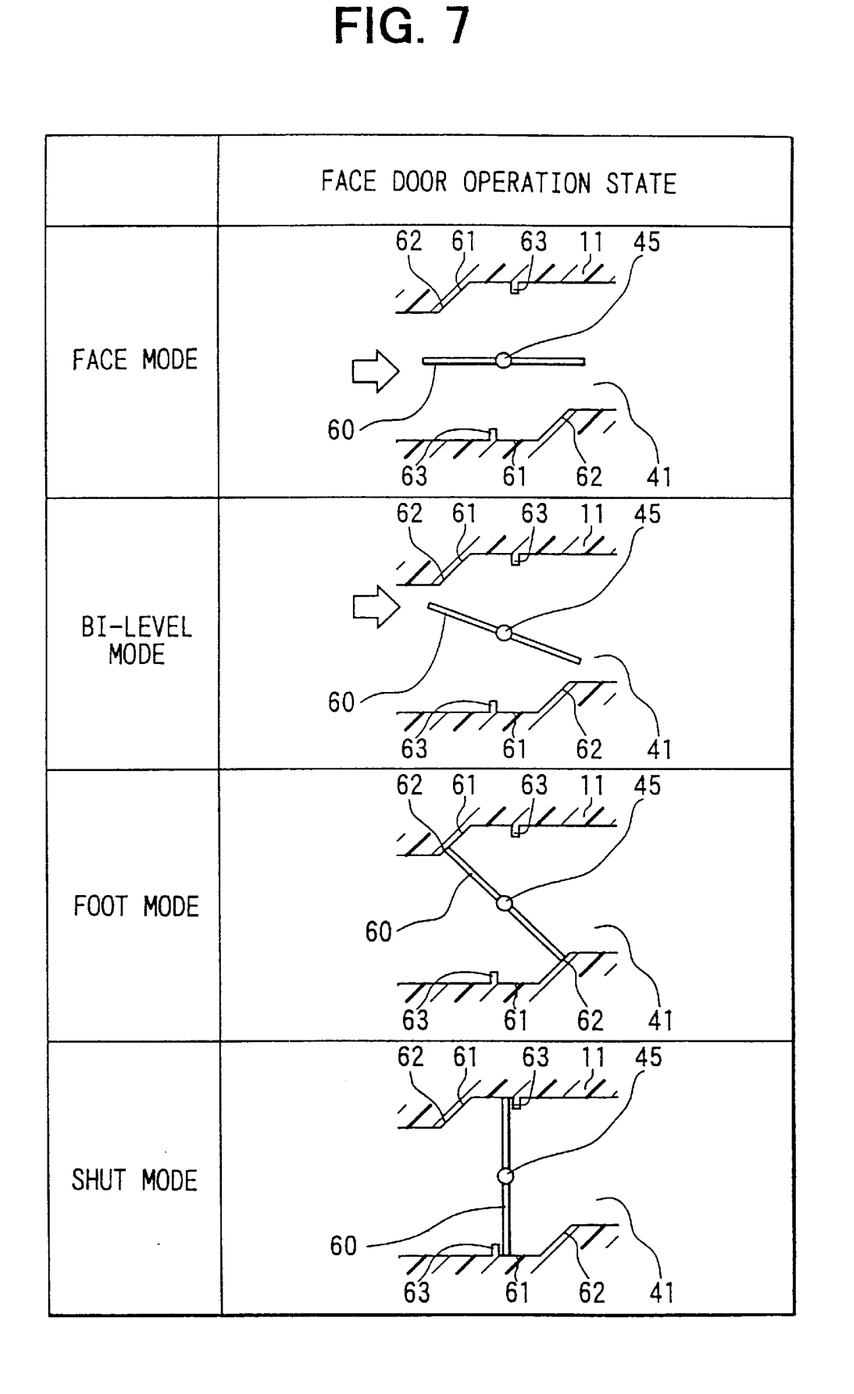
FIG. 7 is a cross-sectional for an air conditioning apparatus for a vehicle according to the present invention.

As shown in FIG. 7, to avoid interference with the face door 60 for the rear seat, recess portions 61 is formed on the outside of the rotation trajectory of the front end of the face door 60. Each is in one place at the top and at the bottom of air conditioning case 11 where the face outlet 41 for the rear seat is formed. A first seating surface 62 for the face, which contacts the sealing packing located at both front ends of the face door 60 where the face door 60 is rotated through 45 degrees from the face mode position (total opening position), is formed on one end of the recess portion 61 for the face. Furthermore, a second seating surface 63 for the face, which contacts the face door 60 for the rear seat where the face door 60 for the rear seat is rotated through 90 degrees from the face mode position is formed on the other end of the recess portion 61 for the face, to protrude into the air passage.

In the face mode, the face door 60 for the rear seat totally opens the face outlet 41 for the rear seat. In the bi-level mode, the face door 60 for the rear seat rotates clockwise through 22.5 degrees from its position during the face mode and half opens the face outlet 41 for the rear seat. Furthermore, in the foot mode, the face door 60 for the rear seat rotates clockwise through 45 degrees from its position during the face mode, and both front ends of the face door 60 for the rear seat contacts the first seating surfaces 62 for the face and close the face outlet 41 for the rear seat. Moreover, in the defroster mode, the face door 60 for the rear seat rotates clockwise through 90 degrees from its position during the face mode, the face door 60 for the rear seat contacts the second seating surface 63 for the face and totally closes the face outlet 41 for the rear seat.

In Embodiment 1, the face door 43 for the rear seat was a plate-shaped cantilever door. However, the face door 70, for the rear seat, which consists of a rotary door in Embodiment 3 illustrated by FIG. 8, can also be used. Components which are not shown in FIG. 8 are identical to those described in Embodiment 1.

Figure 8:
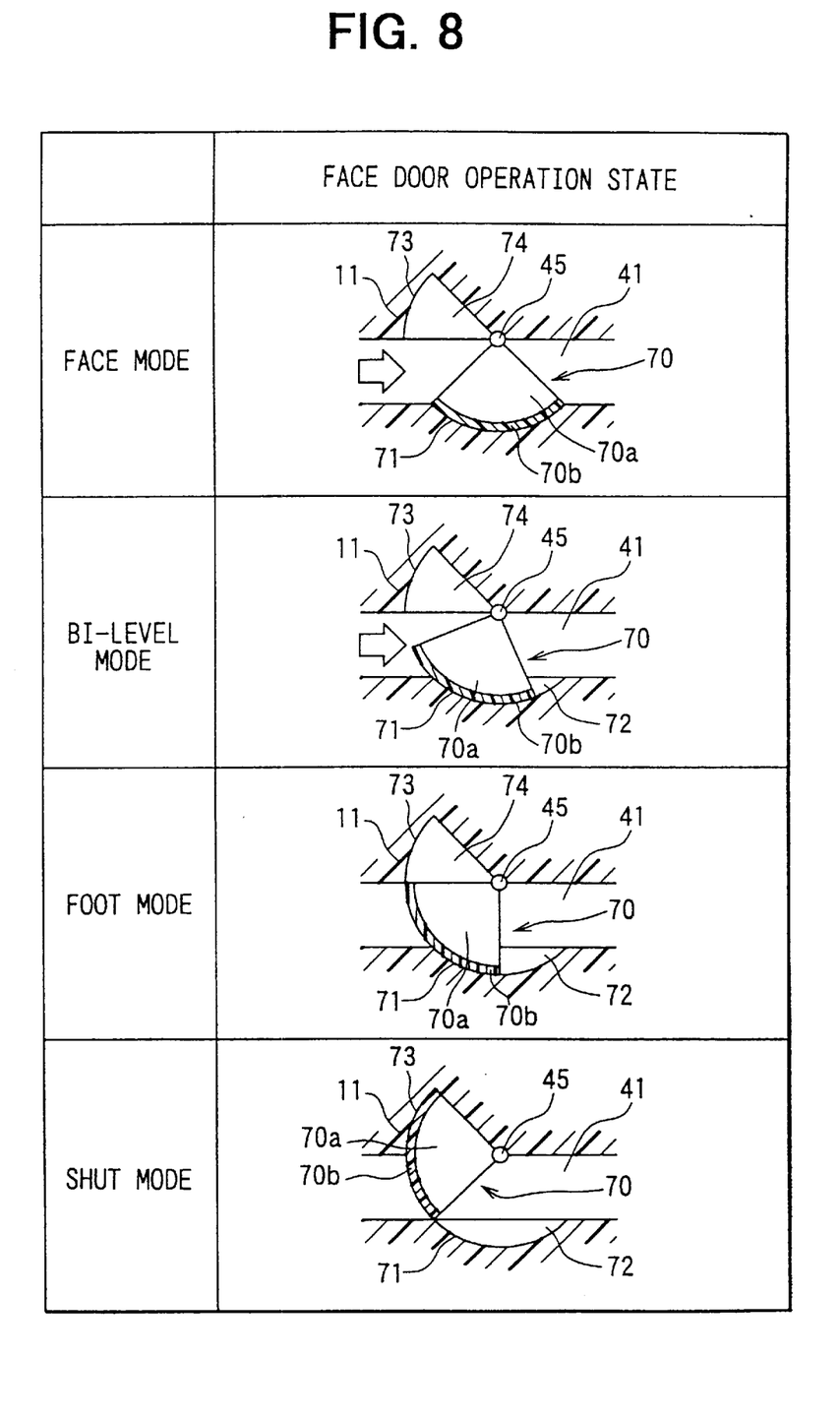
FIG. 8 is a cross-sectional view for an air conditioning apparatus for a vehicle according to the present invention.

In FIG. 8, the face door 70 for the rear seat, which is made of a resin, has fan-like connection plates 70a connected to the rotary shaft 45, and an arcuate peripheral plate 70b formed on the peripheral portion of the connection plates 70a integrally therewith. Here, the length of the peripheral plate 70b in the rotation direction (tangential direction) is set to close the face outlet 41 for the rear seat within a range from the foot mode position to the shut mode position. The connection plates 70a have a central angle of 90 degrees and are arranged on both ends of the peripheral plate 70b in the direction perpendicular to the paper sheet. Therefore, the space bounded by the two connection plates 70a and the peripheral plate 70b is used as a passage for the blown air. Furthermore, a well-known sealing packing (not shown) is attached to the peripheral edge of the peripheral plate 70b.

A first recess portion 72 for the face, which has a first arcuate surface 71 (first seating surface for the face) matching the rotation trajectory of the front end .of the face door 70, is formed in air conditioning case 11 to avoid interference with the face door 70. The lengths of the first arcuate surface 71 and the peripheral plate 70b in the tangential direction are set to be almost equal. When the face door 70 is in the face mode position, the peripheral plate 70b is totally contained inside the first recess portion 72 for the face.

Furthermore, a second recess portion 74 for the face, which has a second arcuate surface 73 (second seating surface for the face) matching the rotation trajectory of the front end of the face door 70, is formed in air conditioning case 11 to avoid interference with the face door 70. The length of the second arcuate surface 73 in the tangential direction is set to be half (or no less than half) of the length of-the peripheral plate 70b in the tangential direction. When. the face door 70 is in the shut mode position, the face door 70 is partially contained inside the second recess portion 74 for the face.

Further, in the face mode, the peripheral plate 70b of the face door 70 is positioned inside the first recess portion 72 for the face, and the peripheral plate 70b does not block the air passage. As a result, the face outlet 41 for the rear seat fully opens. In the bi-level mode, the face door 70 rotates clockwise through 22.5 degrees from its position during the face mode, and the air passage is half blocked by the peripheral plate 70b. As a result, the face outlet 41 for the rear seat is in a half-opened state.

Furthermore, in the foot mode, the face door 70 rotates clockwise through 45 degrees from its position during the face mode. The peripheral plate 70b contacts both arcuate surfaces 71, 73 and blocks the air passage. As a result, the face outlet 41 for the rear seat is in a fully closed state. Furthermore, in the defroster mode, the face door 70 rotates clockwise through 90 degrees from its position during the face mode, and half of the face door 70 is positioned inside the second recess portion 74 for the face. In this position, the peripheral plate 70b contacts both arcuate surfaces 71, 73, and the peripheral plate 70b blocks the air passage. As a result, the face outlet 41 is in a fully closed state.

Figure 9:
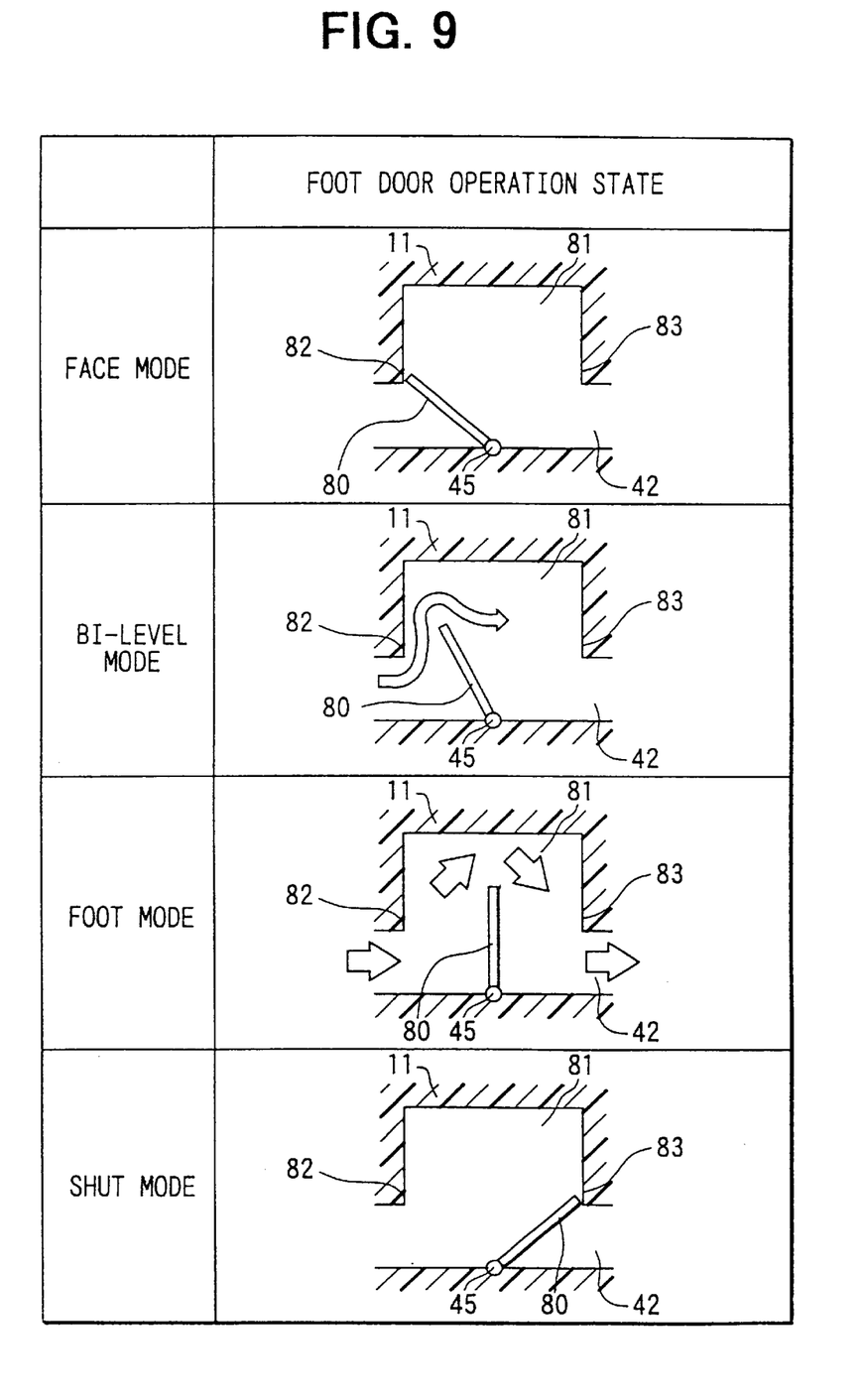
FIG. 9 is a cross sectional view for an air conditioning apparatus for a vehicle according to the present invention.

In Embodiment 1, the foot door 44 for the rear seat was a plate-shaped butterfly door. However, a foot door 80 for the rear seat, which consists of a plate-shaped cantilever door in Embodiment 4 and illustrated by FIG. 9, can also be used. Components which are not shown in FIG. 9 are identical to those described in Embodiment 1. As shown in FIG. 9, a concave recess portion 81 for the foot, which creates an air passage, is formed in the region of air conditioning case 11 where the foot outlet 42 for the rear seat was formed. A first seating surface 82 for the foot is formed in the corner portion upstream of the recess portion 81 for the foot. A second seating surface 83 for the foot is formed in the corner portion downstream of the recess portion 81 for the foot. Furthermore, a well-known sealing packing is attached with an adhesive or the like to the peripheral edge of the foot door 80.

In the face mode, the front end of the foot door 80 contacts the first seating surface 82 for the foot and fully closes the foot outlet 42 for the rear seat. In the bi-level mode, the foot door 80 rotates clockwise through 22.5 degrees from its position during the face mode and separates from the first seating surface 82 for the foot, thereby slightly opening the passage of the recess portion 81 for the foot and half opening the foot outlet 42 for the rear seat.

Furthermore, in the foot mode, the foot door 80 rotates clockwise through 45 degrees from its position in the face mode. Also, the foot door 80 opens significantly past the recess portion 81 for the foot and fully opens the foot outlet 42 for the rear seat. Furthermore, in the defroster mode, the foot door 80 rotates clockwise through 90 degrees from its position during the face mode, and the front end of the foot door 80 contacts the second seating surface 83 for the foot and fully closes the foot outlet 42 for the rear seat.

In Embodiment 1, the foot door 44 for the rear seat was a plate-shaped butterfly door. However, a foot door 90 for the rear seat, which consists of a rotary door in Embodiment 5 and illustrated by FIG. 10, can also be used. Components which are not shown in FIG. 9 are identical to those described in Embodiment 1.

Figure 10:
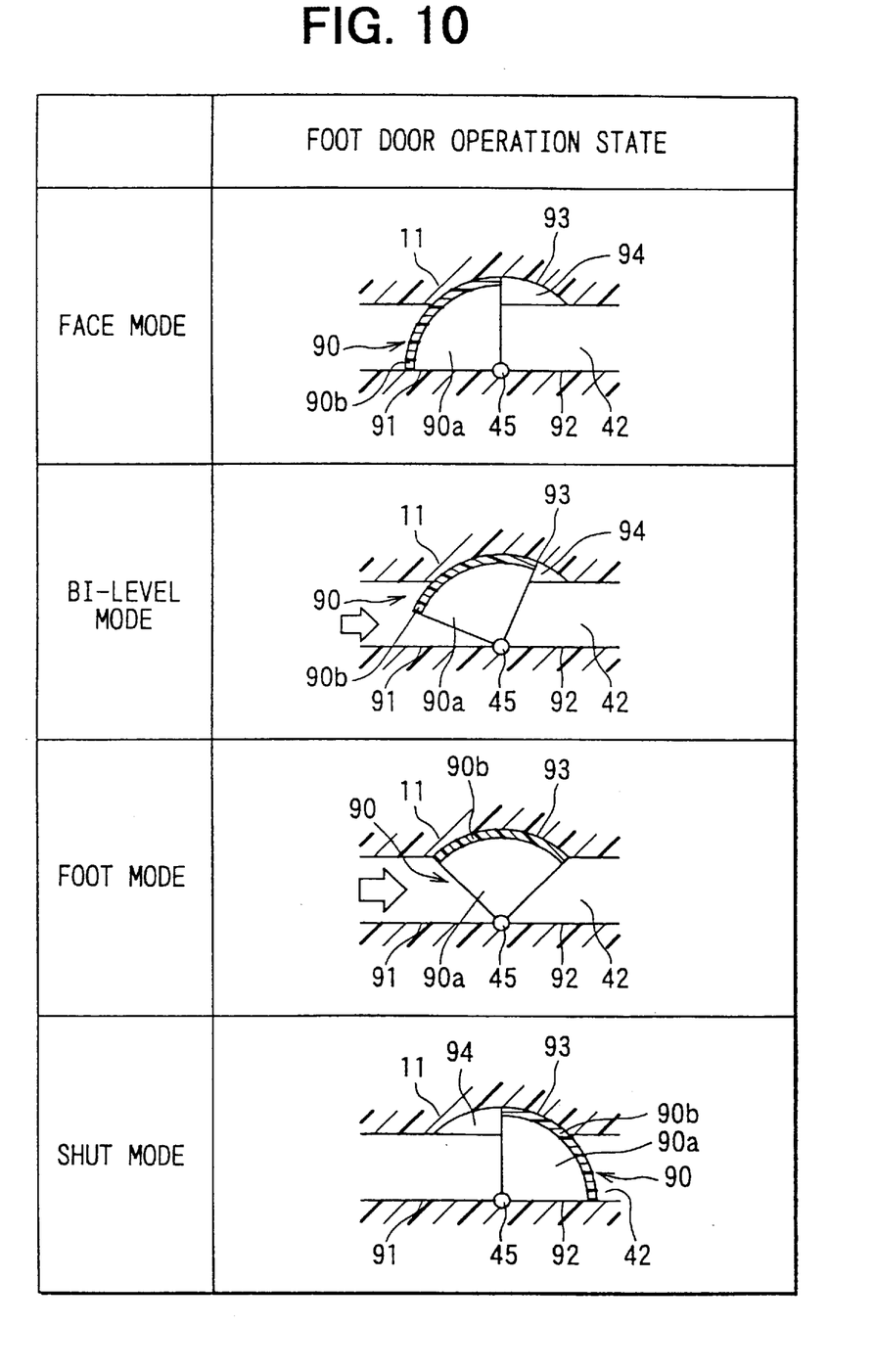
FIG. 10 is a cross-sectional view of an air conditioning apparatus for a vehicle according to the present invention.

In FIG. 10, the foot door 90 for the rear seat, which is made of a resin, has fan-like connection plates 90a connected to the rotary shaft 45, and an arcuate peripheral plate 90b formed on the peripheral portion of the connection plates 90a integrally therewith. The connection plates 90a have a central angle of 90 degrees and are disposed on both ends of the peripheral plate 90b in the direction perpendicular to the paper sheet. Therefore, the space bounded by the two connection plates 90a and the peripheral plate 90b is used as a passage for the blown out air. Furthermore, a well-known sealing packing (not shown) is attached to the peripheral edge of the peripheral plate 70b.

A first seating surface 91 for the foot, which contacts one end of the peripheral plate 90b in the tangential direction in the face mode, and a second seating surface 92 for the foot, which contacts the other end of the peripheral plate 90b in the tangential direction in the shut mode, are formed in air conditioning case 11. Furthermore, a recess portion 94 having an arcuate surface 93 (third seating surface for the foot) for the foot that matches the rotation trajectory of the front end of the foot door 90 is formed in air conditioning case 11 to avoid interference with the face door 90. The lengths of the arcuate surface 93 and the peripheral plate 90b in the tangential direction are set to be almost equal. Thus, when the foot door 90 for the rear seat is in the foot mode position, the peripheral plate 90b is totally contained inside the recess portion 94 for the foot.

Further, in the face mode, the peripheral plate 90b contacts both the first seating surface 91 for the foot and the arcuate surface 93 and blocks the air passage. As a result, the foot outlet 42 for the rear seat is in a totally closed state. In the bi-level mode, the foot door 90 for the rear seat rotates clockwise through 22.5 degrees from its position during the face mode. A greater part of the foot door 90 for the rear seat enters into the recess portion 94 for the foot, and the peripheral plate 90b separates from the first seating surface 91 for the foot. As a result, the foot outlet 42 for the rear seat is in a half-opened state.

Furthermore, in the foot mode, when the foot door 90 for the rear seat rotates clockwise through 90 degrees from its position during the face mode, the peripheral plate 90b is totally contained inside the recess portion 94 for the foot. As such, the peripheral plate 90b does not block the air passage. As a result, the foot outlet 42 for the rear seat is in a fully opened state. Furthermore, in the defroster mode, the foot door 90 for the rear seat rotates clockwise through 90 degrees from its position during the face mode, the peripheral plate 90b contacts both the second sheet surface 92 for the foot and the arcuate surface 93 and blocks the air passage. As a result, the foot outlet 42 for the rear seat is in a fully closed state.

In the above-described embodiment, the explanation was conducted with respect to the case when the channel 16 for the front seats of the heater core 13 was partitioned into the channel 16a at a driver's seat side and the channel 16b at a passenger's seat side by a partition member 18 located in the center in the left-right direction. However, the present invention can be used with no partitioning member 18 and where the channel 16 is not partitioned in the left-right direction. In this case, the doors 20a, 20b, doors 26a, 26b, doors 31a, 31b, and doors 350a, 350b may be integrated doors, none of which are divided in the left-right direction.

Furthermore, the present invention can also be applied to the air conditioning apparatus where the conditioned air is blown only to the front seats or only to the rear seat. Moreover, in Embodiment 1, an example was described in which a butterfly door was used as the face door for the rear seat, and a cantilever door was used as the foot door. However, cantilever doors, butterfly doors, rotary doors and the like can be used in various combinations for the face doors for the rear seat and foot doors for the rear seat. Furthermore, in the above-described embodiments, the rear seat side was set in a shut mode when the defroster mode was selected. However, the rear seat side may be set in a shut mode in the same manner even when there are no rear seat occupants.

Furthermore, in Embodiment 3 and Embodiment 5, the peripheral plates 70b, 90b have an arcuate shape, but the peripheral plates 70b, 90b may also have a plate-like shape.

While the above-described embodiments refer to examples of usage of the present invention, it is understood that the present invention may be applied to other usage, modifications and variations of the same, and is not limited to the disclosure provided herein.

What is claimed is:

1. An air conditioning apparatus for a vehicle comprising:

a case defining an air path;

a first heat exchanger disposed within said air path for cooling air that flows through said air path;

a second heat exchanger disposed within said air path for heating air that flows through said air path;

a rear face outlet defined by said case, said rear face outlet adapted to channel air from said air path toward a head of a rear seat vehicle occupant;

a rear face door pivotably attached to said case for opening and closing the rear face outlet;

a pair of rear foot outlets defined by said case, said rear face outlets adapted to channel air from said air path toward the feet of a rear seat vehicle occupant;

said rear face outlet and said rear foot outlets being arranged so that said rear face outlet is between said rear foot outlets;

a pair of rear foot doors pivotably attached to said case for opening and closing the foot outlets;

a rotatable shaft operationally connected to said case, to said rear face door and to said rear foot doors;

wherein said rear face door opens said rear face outlet and said rear foot doors close said rear foot outlets when said rotatable shaft is operated to a face mode position;

wherein said rear face door closes said rear face outlet and said rear foot doors open said rear foot outlets when said shaft is operated to a foot mode position, said foot mode position obtained by rotating said rotatable shaft in a predetermined direction from said face mode position; and wherein said rear face door closes said rear face outlet and said rear foot doors close said rear foot outlets when said shaft is operated to a shut mode position in said predetermined direction.

2. The air conditioning apparatus for a vehicle according to claim 1, further comprising:

front outlets defined by said case that are adapted to blow air from said air path toward a front seat vehicle occupant; and defroster outlets defined by said case which are adapted to blow air from said air path toward a windshield glass of said vehicle;

wherein said shaft is operated to said shut mode position if a defroster mode is selected, wherein air is blown from said defroster outlets when in said defroster mode.

3. The air conditioning apparatus according to claim 1, wherein both said rear face outlet and said rear foot outlets are opened to an intermediate position between said face mode position and said foot mode position.

4. The air conditioning apparatus according to claim 1, wherein at least one of said rear face door and said rear foot doors is a rectangular-shaped door.

5. The air conditioning apparatus according to claim 1, wherein at least one of said rear face door or said rear foot doors is a rotary door, said rotary door having peripheral plates opening and closing said respective outlet or outlets, said rotary door having connection plates connecting the peripheral plates and said shaft.

6. The air conditioning apparatus according to claim 1, wherein:

said rear face door is a plate-shaped door; and said case has a recess portion allowing rotation of said rear face door between said foot mode position and said shut mode position, said case having two seating surfaces, said two seating surfaces and said rear face door contacting to close said rear face outlet in said foot mode position and said shut mode position.

7. The air conditioning apparatus according to claim 1, wherein:
   said rear face door has a peripheral plate for opening and closing said rear face outlet, said rear face door has a connection plate connecting the peripheral plate and said shaft, and said air conditioning apparatus further comprises:
   a recess portion formed in said case that provides clearance between said case and said rear face door to allow said rear face door to rotate between said foot mode position and said shut mode position; and
   wherein said peripheral plate has a length which allows said rear face outlet to remain closed between said foot mode position and said shut mode position.

8. The air conditioning apparatus according to claim 1, said rear foot doors are a plate-shaped doors, said case is provided with plural seating surfaces, said plural seating surfaces and said rear foot doors closing said rear foot outlets when said rear foot doors are in said face mode position and said shut mode position.

9. The air conditioning apparatus according to claim 1, further comprising:
   a peripheral plate, said rear foot doors including said peripheral plate, said peripheral plate opening and closing said rear foot outlets;
   a connection plate connecting the peripheral plate and said shaft;
   a first seating surface formed in said case which contacts a first side of said peripheral plate in said face mode position, a second seating surface formed in said case which contacts a second side of said peripheral plate in said shut mode position, and a third seating surface formed in said case which is constantly in contact with said peripheral plate between said face mode position and said shut mode position, and
   said peripheral plate contacts both said first seating surface and said third seating surface and said rear foot outlets are closed in said face mode position, said peripheral plate contacts both said second seating surface and said third seating surface and said rear foot outlets are closed in said shut mode position.

10. The air conditioninig apparatus for a vehicle according to claim 1, wherein the air flow through said rear face outlet is parallel to the air flow through said rear foot outlets.

11. An air conditioning apparatus for a vehicle comprising:
   a case, the case having a first opening through which air passes to a vehicle compartment, the case having a second opening through which air passes to said vehicle compartment;
   a first door attached to said case for opening and closing the first opening to control airflow into said vehicle compartment, said first door being flat;
   a second door attached to said case for opening and closing the second opening to control airflow into said vehicle compartment, said second door being flat;
   a rotatable shaft pivotally attached to said first door and said second door; wherein said first door and said second door are disposed relative to each other and relative to said first and second openings such that;
   said first door opens said first opening and said second door closes said second opening when said shaft is operated to a face mode position;
   said first door closes said first opening and said second door opens said second opening when said shaft is operated to a foot mode position, said foot mode position is obtained by rotating said shaft in a predetermined direction from said face mode position;
   said shaft is rotated to a shut mode position which is obtained by further rotating said shaft in said predetermined direction from said foot mode position; and
   said first door closes said first opening and said second door closes said second opening when said shaft is operated to said shut mode position.

12. The air conditioning apparatus for a vehicle according to claim 10, wherein the air flow through said first opening is parallel to the air flow through said second opening.

* * * * *